US009298346B2

(12) United States Patent
Le Clerc et al.

(10) Patent No.: US 9,298,346 B2
(45) Date of Patent: Mar. 29, 2016

(54) METHOD FOR SELECTION OF AN OBJECT IN A VIRTUAL ENVIRONMENT

(75) Inventors: Francois Le Clerc, Cesson-Sévigné (FR); Vincent Alleaume, Cesson-Sévigné (FR); Pierrick Jouet, Cesson-Sévigné (FR)

(73) Assignee: Thomson Licensing, Boulogne, Billancourt (FR)

( * ) Notice: Subject to any disclaimer, the term of this patent is extended or adjusted under 35 U.S.C. 154(b) by 25 days.

(21) Appl. No.: 13/068,549

(22) Filed: May 14, 2011

(65) Prior Publication Data
US 2011/0302535 A1 Dec. 8, 2011

(30) Foreign Application Priority Data

Jun. 4, 2010 (FR) ...................................... 10 54395

(51) Int. Cl.
G06F 3/0481 (2013.01)
G06F 3/01 (2006.01)
(Continued)

(52) U.S. Cl.
CPC ............ *G06F 3/04815* (2013.01); *G06F 3/017* (2013.01); *G06F 3/04817* (2013.01); *G06F 3/016* (2013.01); *G06F 3/04883* (2013.01); *G06T 19/006* (2013.01)

(58) Field of Classification Search
CPC . G06F 3/04815; G06F 3/016; G06F 3/04883; G06T 19/00; G06T 19/006
USPC ........... 715/848, 852, 863; 345/156, 419, 420
See application file for complete search history.

(56) References Cited

U.S. PATENT DOCUMENTS 7,227,526 B2 * 6/2007 Hildreth et al. ............... 345/156
2008/0122786 A1 * 5/2008 Pryor et al. .................... 345/156
(Continued)

FOREIGN PATENT DOCUMENTS

CN 101344816 1/2009
CN 101501614 A 8/2009
(Continued)

OTHER PUBLICATIONS

Hosoya et al., "Arm-Pointer: 3D Pointing Interface for Real-World Interaction", Computer Vision in Human-Computer Interaction; Lecture Notes in Computer Science, LNCS, Berlin, Heidelberg, pp. 72-82, May 13, 2004.*
(Continued)

Primary Examiner — Ajay Bhatia
Assistant Examiner — Mong-Shune Chung
(74) Attorney, Agent, or Firm — Jeffrey D. Carter

(57) ABSTRACT

The invention relates to a method for selection of a first object in a first virtual environment, the first object being represented in the first environment with a size of value less than a threshold value. According to an exemplary embodiment, in order to make the selection of the first object more convivial, the method includes steps for: estimating a direction associated with a pointing gesture of a user, determining a second object according to the estimated direction, the second object having a size of value greater than the threshold value, and selecting of the first object according to the second determined object. The invention also relates to a multimedia terminal adapted for the implementation of the method for selection.

13 Claims, 4 Drawing Sheets

Figure 1:
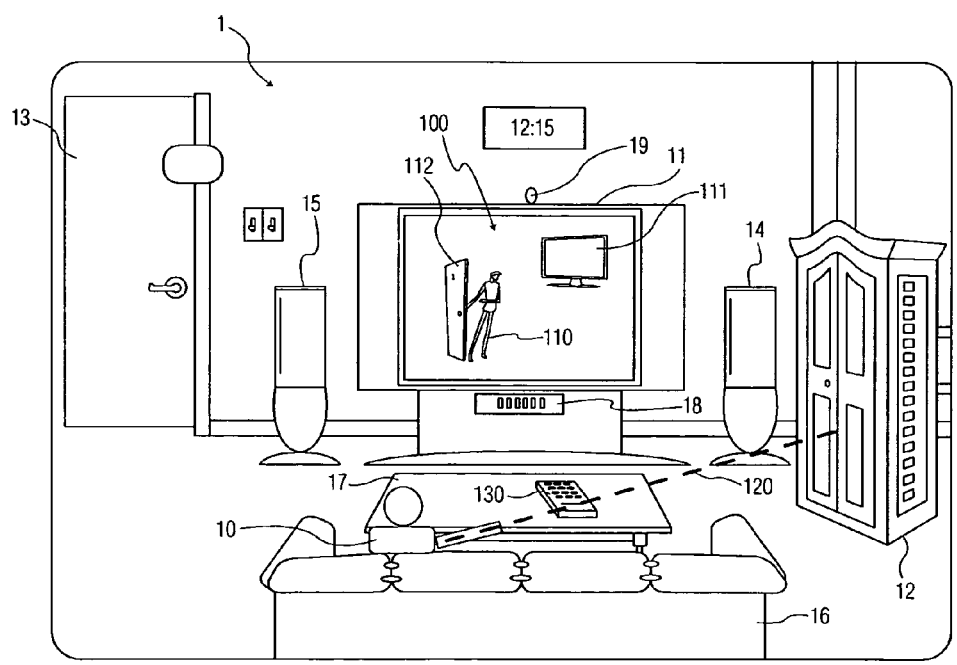

(51) Int. Cl.
*G06F 3/0488* (2013.01)
*G06T 19/00* (2011.01)

(56) References Cited

U.S. PATENT DOCUMENTS

| | | | |
|---|---|---|---|
| 2009/0066690 A1* | 3/2009 | Harrison | 345/419 |
| 2009/0077504 A1* | 3/2009 | Bell et al. | 715/863 |
| 2009/0110235 A1 | 4/2009 | Marti | |
| 2009/0122058 A1* | 5/2009 | Tschesnok | 345/420 |
| 2009/0150802 A1 | 6/2009 | Do et al. | |
| 2009/0217211 A1 | 8/2009 | Hildreth et al. | |
| 2010/0100851 A1* | 4/2010 | Clark et al. | 715/849 |
| 2010/0303293 A1* | 12/2010 | Caduff | 382/103 |
| 2011/0025689 A1* | 2/2011 | Perez et al. | 345/420 |

FOREIGN PATENT DOCUMENTS

| | | |
|---|---|---|
| JP | 2002259989 | 9/2002 |
| JP | 2004272515 | 3/2004 |
| JP | 2009140492 | 6/2009 |
| WO | WO9934327 | 7/1999 |
| WO | WO2008/014826 | 2/2008 |

OTHER PUBLICATIONS

Huang et al., "Voxelized Shape Context based Gesture Analysis using Networked Omni Video Array", Computer Vision and Robotics Research Laboratory, University of California, San Diego, pp. 1-9, Nov. 2004.*

Yamamoto et al., "Arm-Pointing Gesture Interface Using Surrounded Stereo Cameras System", Pattern Recognition, 2004, ICPR 2004, Proceedings of the 17th International Conference on Cambridge, UK, vol. 4, Aug. 23-26, 2004, pp. 965-970.

French Search Report dated Jan. 12, 2011.

http://www.xboxachievements.com/news-1233-E3-2009--The_Microsoft-Press-Conference.

Seon-Min Rhee "Combining Pointing Gestures with Video Avatars for Remote Collaboration", pp. 980-986, 4th International Conference on Universal Access in Human-Computer Interaction, Springer-Verlag, Berlin, Germany, Jul. 12, 2007.

Hiroki Watanabe, et al., "Detection and Estimation of Omni-Directional Pointing Gestures Using Multiple Cameras", pp. 345-348, IAPR Workshop on Machine Vision Applications, Nov. 28-30, 2000, The Unitversity of Tokyo, Japan.

Nebojsa Jojic et al., "Detection and Estimation of Pointing Gestures in Dense Disparity Maps", pp. 468-475, Fourth IEEE International Conference on Automatic Face and Gesture Recognition, Grenoble, France, Mar. 28-30, 2000, ISBN:0-7695-0580-5, DOI:10.1109/AFGR.2000.840676.

Teofilo E. De Campos et al., "Directing the Attention of a Wearble Camera by Pointing Gestures",XIX Brazilian Symposium on Computer Graphics and Image Processing, (SIBGRAPI'06), 0-7695-2686-1/06, 2006 IEEE.

Latoschik et al., "Exploiting Distant Pointing Gestures for Object Selection in a Virtual Environment", pp. 185-196, Gesture and Sign Language in Human-Computer Interaction. International Gesture Workshop, Bielefeld, Germany, Sep. 17-19, 1997, ISBN:3-540-64424-5.

Anuraag Sridhar et al., "Multiple Camera, Multiple Person Tracking with Pointing Gesture Recognition in Immersive Environments", pp. 508-519, Advances in Visual Computing, 4th International Symposium, ISVC 2008, Las Vegas, NV, USA, Dec. 1-3, 2008. Proceedings, Part I, ISBN: 978-3-540-89638-8, DOI 10.1007/978-3-540-89639-5_49.

Enno Littman et al., "Neural Recognition of Human Pointing Gestures in Real Images", pp. 61-71, Neural Processing Letters, Jun. 1996, vol. 3, Issue 2, ISSN: 1370-4621, DOI 10.1007/BF00571679.

Chang-Beom Park et al. "Real-Time 3D Pointing Gesture Recognition in Mobile Space", pp. 1-6, 8th IEEE International Conference on Automatic Face & Gesture Recognition, Sep. 17-19, 2008, ISBN:978-1-4244-2154-1, DOI:10.1109/AFGR.2008.4813448.

\* cited by examiner

METHOD FOR SELECTION OF AN OBJECT IN A VIRTUAL ENVIRONMENT

This application claims the benefit, under 35 U.S.C. §119 of France Patent Application 1054395, filed 4 Jun. 2010.

1. DOMAIN OF THE INVENTION

The invention relates to the domain of user interfaces offering an interaction between a user and a virtual environment and more specifically using an avatar representative of the user in the virtual environment.

2. PRIOR ART

According to the prior art, there are different communication applications that enable a user to interact with remote persons and/or objects, for example through the intermediary of an avatar representing the user, the avatar evolving in a virtual world while the user associated with it evolves in the real world. Different users located in remote areas (for example in different houses, in different town or in different countries) can then communicate through the intermediary of their respective avatars using one or more communication applications, such as for example an online game, a social web, etc. Each application user is represented by an avatar that re-transcribes his speech and/or gestures and/or emotions in order to transmit them to other users of the application. When the communication application used by a user is hosted on a PC (Personal Computer) type computer, the control of the avatar is naturally carried out with simple and convivial control devices, such as the keyboard and mouse for example, that enable the user interactions with the virtual world to be managed simply. However, when the communication application resides in a Set-top box connected to a display device, for example of flat screen (LCD, plasma) type or of projection screen type, the user is typically sitting in an armchair or sofa in his living-room, and the use of control devices such as those used on an computer is not very handy. The interaction between the user and his avatar can then be carried out by means of pointing devices. Gyroscopic remote control units or the gyroscopic mouse, such as those marketed by the Gyration Company, provide examples of such devices.

A more convivial interaction is obtained using a gesture controlled interface, not requiring of the user the manipulation of any device. In these interface types, one or more cameras positioned on the decoder or the television film the user, capturing his gestures that are analysed by image processing to be interpreted classifying them according to a predefined vocabulary in order to infer the associated command. In this user interface type, the selection of an object in the virtual environment remains however problematic. In fact, the reduced size of the representation of virtual objects on the television screen does not enable designation by pointing. The incertitude on the determination of the direction of pointing in general does not authorise a non-ambiguous detection of the object pointed to.

3. SUMMARY OF THE INVENTION

The purpose of the invention is to overcome at least one of these disadvantages of the prior art.

More specifically, the purpose of the invention is notably to propose a simple and convivial user interface base on gesture command.

The invention relates to a method for selection of a first object in a first virtual environment, the first object being represented in the first environment with a size of value less than a threshold value. The method comprises the steps for:

estimating a direction associated with a pointing gesture of a user, determining a second object according to the estimated direction, the second object having a size of value greater than the threshold value, and selecting a first object according to a second determined object.

Advantageously, the second object belongs to a real environment.

According to a particular characteristic, the second object belongs to a second virtual environment.

According to a specific characteristic, the real environment is mapped in three dimensions.

Advantageously, the first object belongs to a group of first objects, the second object belongs to a group of second objects, and the selection of the first object comprises use of a table establishing an association between each first object and a second object.

According to another characteristic, the method comprises a step of acquisition of the pointing gesture using a video camera and of at least one item of depth information.

Advantageously, the determination of the second object comprises a step of calculation of the intersection between a ray and a first element encountered by the ray, the ray having as its origin the part of the body of the user making the pointing gesture, for direction the direction associated with the pointing gesture and for orientation the orientation of the pointing gesture.

According to a particular characteristic, the direction of the pointing gesture is determined by detection of the part of the body of the user making the pointing gesture, and by estimation of a longitudinal axis of the part of the body in a three dimensional space.

The invention also relates to a multimedia terminal comprising a unit for reception of signals representative of pictures captured and a unit for processing of pictures, the picture processing unit comprising:

means for estimating a direction associated with a pointing gesture of a user, means for determining a second object according to the estimated direction, the second object having a size of value greater than a threshold value, and means for selecting a first object according to the second determined object, the first object belonging to a first virtual environment and having a value less than the threshold value.

4. LIST OF FIGURES

Figure 2:
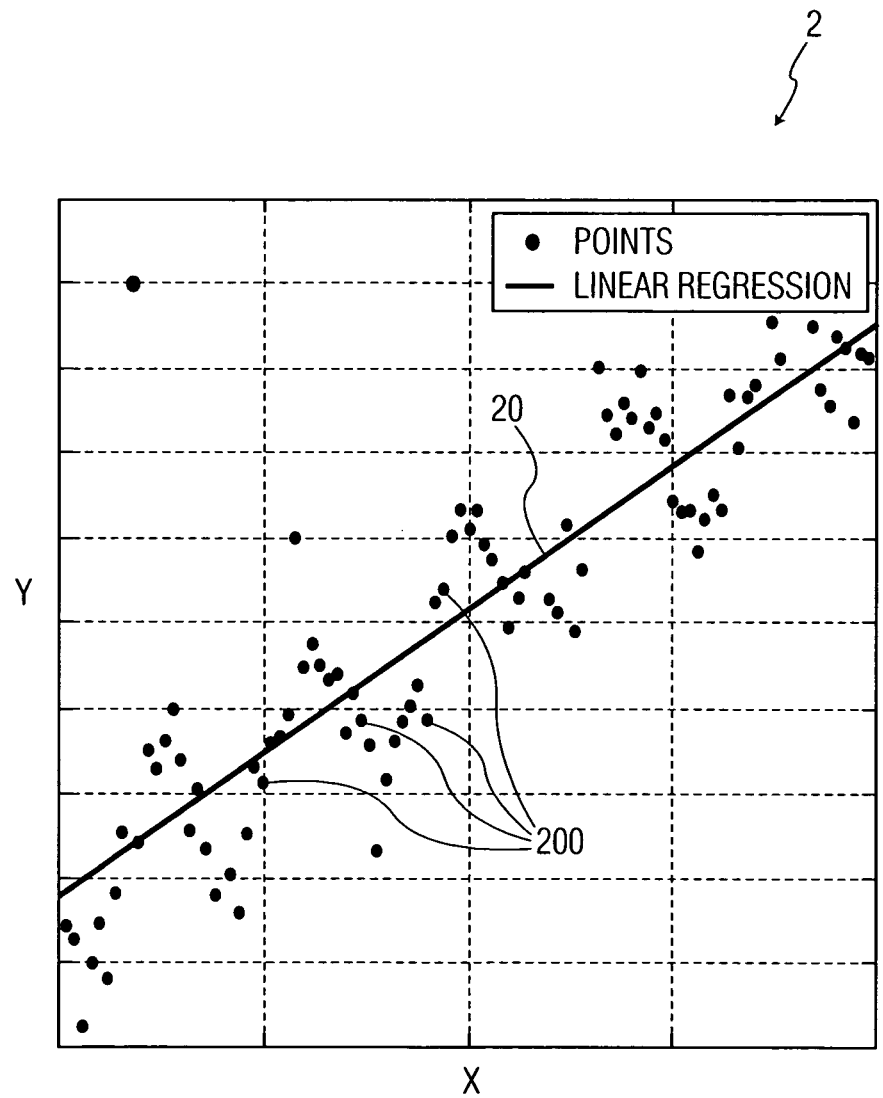
Figure 3:
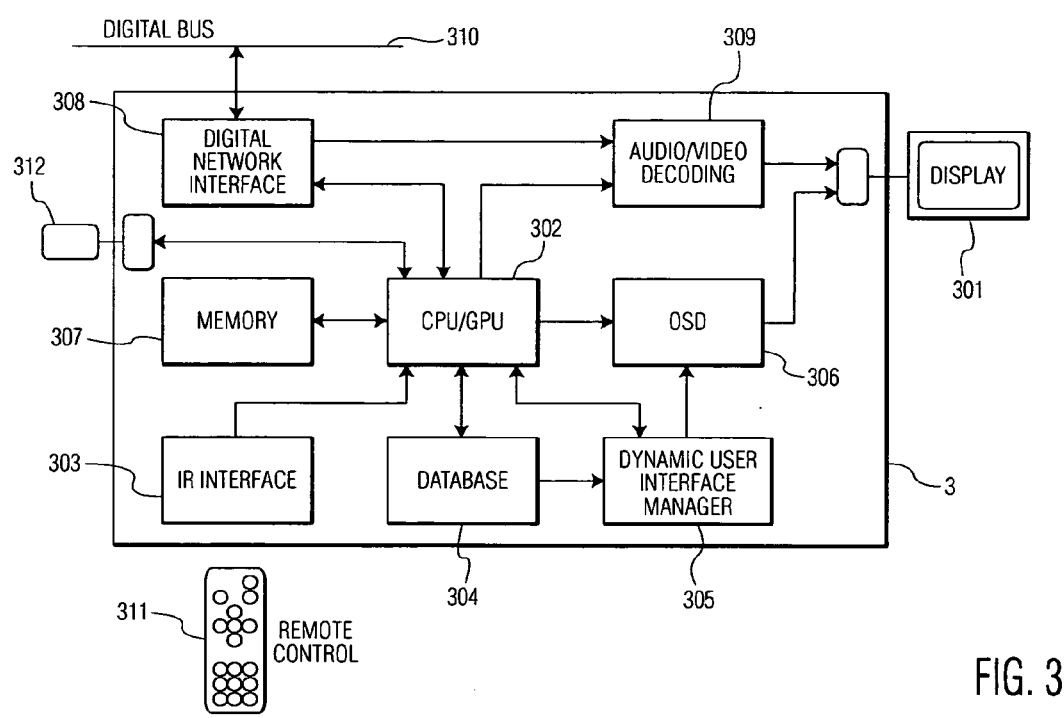
Figure 4:
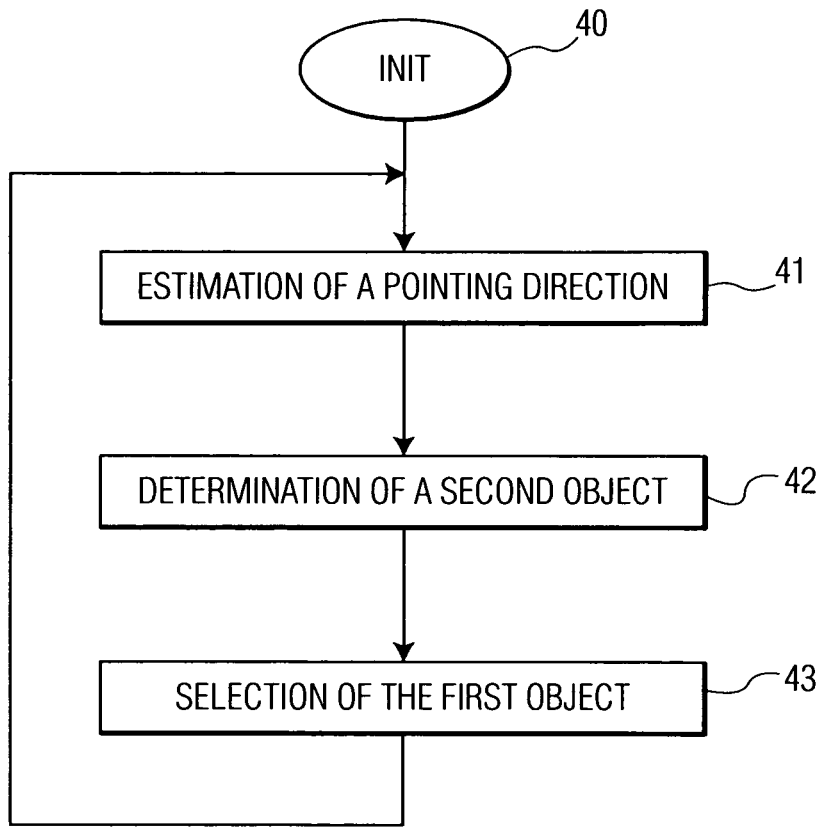

The invention will be better understood, and other specific features and advantages will emerge upon reading the following description, the description making reference to the annexed drawings wherein:

FIG. 1 shows a real environment with a user controlling his avatar in a virtual world, according to a particular embodiment of the invention, FIG. 2 shows a method for estimation of the direction of a gesture performed by the user in FIG. 1, according to a particular embodiment of the invention, FIG. 3 diagrammatically shows the structure of a multimedia terminal for the implementation of the invention, according to a particular embodiment of the invention, and FIG. 4 shows a method for selection of an object in a virtual environment implemented in a multimedia terminal of FIG. 3, according to a particular embodiment of the invention.

5. DETAILED DESCRIPTION OF EMBODIMENTS OF THE INVENTION

FIG. 1 shows a real environment 1 in which there is a user 10 using a virtual environment to communicate with remote interlocutors, through the intermediary of an avatar 110 representing him in the virtual environment. A virtual environment corresponds to any graphical representation of a real (for example a video of a house, a garden, a park, a building, a town, etc.) or imaginary environment or to any environment generated by computer generated image or to any projection, for example holographic, of a real or imaginary environment. The real environment 1 shown with regard to FIG. 1 corresponds to the living-room of the user 10, the user 10 sitting on his sofa 16 to view a display device (for example a plasma display panel or an LCD (Liquid Crystal Display) screen. The living-room of the user corresponding to the real environment 1 of the user comprises a plurality of objects, of which there are particularly: a sofa 16, two audio speakers 14 and 15, a door 13, an armchair 12, a coffee table 17, a display device 11, a multimedia terminal 18 (for example a digital decoder, for example satellite or terrestrial (terrestrial digital television TNT), a games console, a multimedia telephone, a PC Tablet, etc. the multimedia terminal being connected or not to a xDSL Gateway), a camera 19 equipped with a depth sensor, integrated or not in the camera (for example a 3D depth webcam). The camera 19 is connected to the multimedia terminal 18 by a wired or wireless connection. The multimedia terminal 18 is connected to the display device 11 by a wired or wireless connection. The application enabling the user 10 to communicate with remote interlocutors through the intermediary of his avatar 110 is hosted in the multimedia terminal, and the video content displayed by the communication application is displayed on the display device 11. The video content displayed on the display device is representative of a virtual environment 100 in which the avatar 110 representative of the user 10 evolves. The virtual environment 100 comprises one or more virtual objects, of which there is notably a door 112 and a television screen 111. Advantageously a virtual object corresponds to any graphical or holographic representation of a real or imaginary object, this real object having been captured by any means known to those skilled in the art (for example a video camera, a still camera) or generated by picture synthesis.

The displacement of the avatar 110 in the virtual environment 100 is controlled by the user 10. Advantageously, the control of the displacement of the avatar is through the intermediary of a remote control 130, the displacement being commanded by the use of direction keys (↑, ↓, ← and →) for example, the signals transmitted by the remote control being received and decoded by the multimedia terminal 18. According to a variant, the displacement of the avatar is controlled by vocal commands transmitted by the user. The vocal commands are received then decoded by the multimedia terminal 18 through the intermediary of a microphone integrated into the multimedia terminal or deported from the multimedia terminal and connected to this latter by a wired or wireless connection (the microphone is for example integrated into the camera 19 or the display device 11 or the microphone is an isolated device). According to another variant, the displacement of the avatar 110 is controlled by gestures performed by the user. These gestures are captured by the camera 19 before being transmitted to the multimedia terminal 18 to be decoded and interpreted and in order to extract the associated depth information.

During its progression in the virtual environment 100, the avatar 110 is led to select virtual objects from the virtual environment, for example the door 112 to pass from one virtual environment into another (for example to pass from one room into another room of a building in which the avatar moves about) or again an object of any description to displace it from one place to another in the virtual environment. To select the door 112, the user 10 points at a real object belonging to the real environment 1, for example the cupboard, with any part of his body, for example one of his arms. The pointing gesture produced by the user 10 is detected by the camera 19 in the sequence of pictures captured by this camera 19. The detection of the pointing gesture is advantageously carried out using machine learning techniques already widely used for numerous applications of detection and classification in computer vision, for example, the detection of faces in pictures or videos. According to this technique, the picture containing the pointing gesture is compared with a large number of pictures (for example 10,000 pictures) of a knowledge base comprising a set of pictures of people with the arm extended (also called positive pictures) and a large number of pictures of a knowledge base comprising a large set of pictures not representing a person with the arm extended (also called negative pictures). Using this comparison, discriminating attributes are calculated for the picture captured by the camera 19, these attributes being selected from among a family of descriptors of predefined pictures or picture regions. A criterion associating ranges of values of these discriminating attributes with the category of pictures of persons having the arm extended is determined off-line by a machine learning algorithm, for example the AdaBoost algorithm. If, on a captured picture, this criterion is satisfied, then the captured picture is interpreted as being a picture for which the content is representative of a person making a pointing gesture. In the contrary case, the captured picture is associated with a picture of the knowledge base comprising negative pictures and the captured picture is interpreted as not being a picture for which the content is representative of a person making a pointing gesture. In practice, neither the position of the picture of the user inside the captured picture, nor its dimensions, are known. The detection operation described above must thus be repeated for the set of positions and sizes of sub-pictures likely to contain a person having the arm extended, inside of the picture captured by the camera 19.

In the case where the captured picture is interpreted as being a picture for which the content is representative of a person performing the pointing gesture, the part of the picture containing the pointing gesture, in this case the extended arm according to the example of FIG. 1, is extracted by picture analysis. The machine learning technique used to detect a person having the arm extended described above can be reused for this purpose, this time applying detection of the extended arm inside a picture of a person having the arm extended. Using the depth information associated with the pixels of the picture part containing the pointing gesture, the direction associated with the pointing gesture is determined in the 3 dimensional (3D) space of the real environment 1 using a 3D regression technique as shown in FIG. 2, where we are restricted in the interests of clarity to a two-dimensional space. This estimation of the pointing direction is for example carried out using a linear regression mode on the points of the picture corresponding to the detected extended arm. The direction of the pointing gesture advantageously corresponds to the longitudinal axis of the part of the body of the user 10 performing the pointing gesture. Inside of the sub-picture representing the extended arm of the user, the hand of the user is also detected by a machine learning technique identical to the preceding ones, in order to determine the extremity of the arm, that is to say to determine the pertinent extremity of the pointing gesture in order to define the pointing orientation. By use of simple rules of 3D geometry, the intersection between the first real object of the real environment 1 encountered by the calculated regression ray (from the determined direction of the pointing gesture and the determined orientation of the pointing gesture, the origin of the ray corresponding to the pertinent extremity of the pointing gesture) and the calculated regression ray is determined. To do this, the real environment 1 is mapped previously in 3D by the user 10 or by another person by use of a mapping application for example, that is to say that the real objects of the real environment 1 are identified and located associating with them respectively an identifier and coordinates (x, y and z) in the 3D space of the real environment. According to a variant, the real environment is mapped in 3D automatically by the use of an environment capture means (camera associated with a depth sensor for example) and a processing means, for example an adapted mapping application, that analyses the pictures captured of the real environment. Using the 3D mapping of the real environment and the calculated regression ray, it is easy to determine what is the first real object encountered by the regression ray and consequently the object pointed to by the pointing gesture of the user 10. According to a variant, if no real object is encountered by the regression ray, the real object selected is the real object closest to the regression ray, that is to say the real object situated at a distance less than a threshold value (for example 20 cm, 50 cm or 1 m) from the regression ray. The set of distances less than the threshold value advantageously form a tolerance zone, this zone taking the form of a cylinder surrounding the regression ray for which the radius is equal to the threshold value. Advantageously, the real objects mapped in the 3D map of the real environment are of a size greater than a critical size, that is to say greater than a threshold value (for example the smallest of three dimensions of their surrounding parallelepiped is not less than a predetermined value, for example 40 cm, 50 cm or 60 cm or again the smallest of two dimensions of the projection of the object in a plane perpendicular to the pointing direction is not less than 40 cm, 50 cm or 60 cm) such that the imprecision of the determination of the direction of the pointing gesture has no impact on the selection of the real object pointed to. In fact, from these techniques used to estimate the direction of the pointing gesture, the objects that are too small, that is to say the objects having a size less than the threshold value, can only be determined for sure by making the intersection between these objects and the regression ray. The threshold value is advantageously determined according to an information representative of the imprecision of the estimation of the pointing direction.

Once the real object pointed to by the pointing gesture has been determined and identified, the virtual object of the virtual world to which it is associated is selected in its turn by the avatar 110 representative of the user 10. According to the example of FIG. 1, the door 112 is selected by the avatar 110, the user having pointed with his arm to the cupboard 12 that is associated with the door 112. To produce the association between the virtual objects of the virtual environment, also called first objects, and the objects of the real environment 1, also called second objects, an association (or correspondence) table is established, for example by the user 10. This association table for example of LUT (Look-Up table) type, advantageously establishes a one to one association between the first objects and the second objects, a first object being associated with one or more second objects not associated with another first object. Thus, the door 112 is for example associated with the cupboard 12 and with the speaker 14, the television screen 111 being associated with the coffee table 17.

According to an advantageous variant not shown, the user 10 points via his pointing gesture at a second object belonging to a second virtual environment different to the first virtual environment 100. This second virtual environment corresponds for example to a synthesized picture comprising virtual objects each having a size greater than the threshold value enabling them to be selected by pointing a part of the body of the user 10. This second virtual environment is for example projected by a video projector onto a wall of the real environment 1 or onto a sufficiently large projection screen. The advantage of such a variant is that it is not necessary to map the second virtual environment, unlike what is done for the real environment: the two virtual objects of the second virtual environment being composed by picture synthesis, their respective positions are known by default, the determination of the intersection between the second virtual object and the regression ray is simple and automatic. According to another variant, the second virtual environment is a projection of the first virtual environment onto a projection screen, the projection being made in a way so that the size of the first projected virtual objects, which thus become the second objects, is greater than the threshold value so that they can be selected by pointing. The association between the first objects and the second objects is thus no longer necessary, concerning the same objects displayed with different sizes by different display devices (respectively the display device 11 and a video-projector for example).

According to another variant, the user 10 validates his pointing gesture by pronunciation of a vocal command or by pressing a key on the remote control. The multimedia terminal does then not begin the analysis of picture acquired to determine the direction of pointing until the validation command is received. This variant offers the advantage of minimising the analysis of pictures necessary to the detection of pictures representative of a pointing gesture.

Naturally, the part of the body of the user 10 performing the pointing gesture is not limited to that described in reference to FIG. 1, that is to say the arm, but extends also to any part of the body of the user, for example a leg or a finger of one hand.

FIG. 2 shows a method for estimation of the direction of a pointing gesture performed by the user 10, according to a particular embodiment of the invention. For reasons of clarity, FIG. 2 graphically shows the result of the determination of the longitudinal axis of the part of the body and by extension the direction of the pointing gesture in a two-dimensional space (x and y). Advantageously, the longitudinal axis extends in a three-dimensional (x, y and z) space, the real environment 1 being a three dimensional space. The points 200 corresponding to the points belonging to the part of the body of the user performing the pointing gesture, for example the arm of the user, these points being determined from the picture of the pointing gesture captured by the camera 19 (or more specifically from the part of the picture for which the content corresponds to the part of the body performing the pointing gesture) and using the depth information associated with each of the pixels of the part of the picture representing the part of the body of the user performing the pointing gesture. This depth information is captured by a depth sensor associated with the camera 19 and this information is advantageously recorded in a depth map (or z-map). From the three-dimensional constellation of points 200, the longitudinal axis or the direction of the pointing gesture is determined by linear regression or by multiple linear regression, each of the points 200 having coordinates ($x_i$, $y_i$ and $z_i$), the coordinate $z_i$ not being shown in FIG. 2. The line 20 representing the direction of the pointing gesture is represented by a system of two equations in the form:

$$\begin{cases} ax + by + cz + d = 0 \\ a'x + b'y + c'z + d' = 0 \end{cases}$$

Using the sample of points 200 for which the spatial coordinates ($x_i$, $y_i$ and $z_i$) have been determined, the determination of constants a, b, c, d, a', b', c' and d' is easy by the use of the least squares method that enables the line passing closest to the points 200 to be determined, that is to say the line 20 that renders minimal the sum of squares of deviations of points 200 to the line 20.

Naturally, the method used to estimate the direction of the pointing gesture of the user 10 is not limited to that described with respect to FIG. 2, that is to say by linear regression, but extends to all methods known to those skilled in the art, for example by regression according to the least median of squares or again by regression by the method of least weighted iterated squares.

FIG. 3 diagrammatically shows the structure of a multimedia terminal 3 corresponding for example to the multimedia terminal 18 of FIG. 1, according to a particular embodiment of the invention.

The terminal 3 is advantageously connected to a display device 301 corresponding for example to the display device 11 of FIG. 1. According to a variant, the terminal 3 is connected to two or more display devices, for example a television screen and a video-projector. The terminal 3 comprises a central unit 302 connected to a program memory 307, a database 304 and a dynamic user interface manager 305, and an interface 308 for communication with a high bitrate digital network 310 enabling audio/video data to be transmitted live. This network is for example a network in compliance with the standard IEEE 1394. The terminal 3 also comprises an interface enabling communication with a video camera 312, for example a reception unit of acquisition signals transmitted by the video camera 312, the video camera 312 being associated with a depth sensor integrated into the camera. According to a variant, the depth sensor is dissociated physically from the camera 312, the depth sensor being for example integrated into the terminal 3, or integrated into the display device 301 or being a dedicated peripheral device. According to another variant, the camera 312 is an element integrated into the terminal 3. According to another variant, the camera 312 is integrated into the display device 301. The terminal 3 also comprises an infra-red signal receiver 303 to receive signals from a remote control 311, a memory 304 for the storage of a database, and an audio/video decoding logic 309 for the creation of audiovisual signals transmitted to the display device 301. The remote control 311 is equipped with navigation keys ↑, ↓, → and ←, a numerical keypad and an "OK" key. Gyration type remote controls, equipped with motion sensors can also be used.

The terminal 3 also comprises a data display circuit 306 on the screen, often called an OSD (On Screen Display) circuit. The OSD circuit 306 is a text and graphics generator that enables the on screen display of menus, pictograms (for example, a number corresponding to the channel displayed) and that enables the display of the avatar 110 of FIG. 1 representative of the user 10 in accordance with the present invention. The OSD circuit receives information from the central unit 302 comprising one or several microprocessors (or CPU) and one or several GPU (Graphical Processing Unit) and a dynamic user interface manager 305 generating the display signals of the avatar 110 and any other graphical component of a user interface. Advantageously, the GPUs carry out the processing of pictures captured by the camera 312, notably to determine which are the pictures for which the content is representative of a pointing gesture and in the contrary case to determine the direction and the orientation of the pointing gesture. The depth information captured by the depth sensor is advantageously stored in the depth map stored in a part of the memory 307 (that advantageously takes the form of a GRAM (Graphical Random Access Memory)) or in the database 304. The algorithms implementing the step of the method specific to the invention and described hereafter are stored in another part of the memory 307, advantageously taking the form of a RAM (Random Access Memory). When turned on and once the parameters representative of the virtual environment 1 and the avatar 110 are loaded into the GRAM part of the memory 307, the parameters representative of the avatar are stored in the database 304, the instructions of the communication application stored in the RAM part of the memory 307 or in the dynamic user interface manager 305 are executed by the CPU 302.

The multimedia documents that the terminal 3 is able to reproduce are audiovisual documents, audio documents, or photos.

According to a variant, the remote control 311 is replaced by a device able to detect the gestures of the spectator, for example the camera 312 associated with the depth sensor. The gestures are then analysed by a module, dedicated or not, of the terminal 3 to be interpreted into commands to displace the avatar 110 in the virtual world 1. According to a variant, the remote control is replaced by a microphone type device able to record a vocal command. The sounds composing the vocal command are then analysed by a module, dedicated or not, of the terminal 3 to be interpreted into a command to displace the avatar 110 in the virtual world 1.

FIG. 4 shows a method for selection of a first object in a first virtual environment intended to be implemented in a multimedia terminal 3, according to a first non-restrictive particularly advantageous embodiment of the invention.

During an initialisation step 40, the different parameters of the terminal are updated.

Then, during a step 41, the direction associated with the pointing gesture of a user moving about in a real environment is estimated. According to the requirements, the real environment is mapped in 3 dimensions, that is to say the objects composing this real environment are modelled in a 3D map according to any method known to those skilled in the art, the 3D map comprising information relative to the position (that is to say the coordinates) and the bulkiness (that is to say the size) of objects in the space defining the real environment. Advantageously, the estimation of the direction of the pointing gesture comprises a step of acquisition of the pointing gesture by a video camera and the acquisition of an item of depth information by a depth sensor, the depth information being representative of distances between on one hand each pixel or groups of pixels of the captured picture and on the other hand the camera or the depth sensor, this information being for example recorded in a depth map. According to a variant, the direction of the pointing gesture is estimated from several video cameras, for example 2 cameras providing a stereoscopic picture of the pointing gesture, the depth information being then estimated by calculation of disparities between each of the pictures captured by the plurality of cameras. Advantageously, the determination of the direction of the pointing gesture is determined by estimating the longitudinal axis of the part of the body of the user who performs the pointing gesture, according to any method known to those skilled in the art, for example by linear regression.

Then, during a step 42, a second object is determined according to the estimated direction of the pointing gesture of the user. The second object is advantageously determined by calculating the intersection between on one hand the ray having as origin the extremity of the part of the body performing the pointing gesture, the direction of the pointing gesture and the orientation of the pointing gesture and on the other hand the first of the second objects encountered by this ray. The second object is of a size greater than a threshold value, the threshold value corresponding to the minimum size that an object can have to be determined by the calculation of the intersection with the ray, the estimation of the direction of the pointing gesture being subjected to an estimation imprecision. According to a variant, the second object is the first of the second objects situated close to the ray, that is to say within a radius less than a predetermined threshold value around the ray.

Advantageously, the second object determined is a real object belonging to the real environment, the second object being one of the objects mapped of the real environment. According to a variant, the second object is a virtual object belonging to a second virtual environment, the second virtual environment being for example projected onto a wall of the real environment in which the user moves about or onto a projection screen placed in the real environment and having a content different to that of the first virtual environment. According to this variant, the second object or objects of the projected virtual environment each have a size greater than the threshold value mentioned previously. According to this variant, the mapping of the real environment is superfluous. According to another variant, the second object is a virtual object of the first virtual environment displayed with a size greater than the threshold value, the objects of the first virtual environment, known as first objects, being displayed or represented on a display device that the user views with a size less than the threshold value. According to this variant, the mapping of the real environment is also superfluous.

Finally, during a step 43, the first object is selected using the second determined object. The selection of the first object is carried out using an item of association information representative of the association between each of the first objects of the virtual environment and a second object (belonging to the real environment or to a second virtual environment or to a second representation of the first virtual environment or to the three preceding environments).

Naturally, the invention is not limited to the embodiments previously described.

In particular, the invention is not limited to a method for selection of a first object in a first virtual environment but extends also to the multimedia terminal implementing such a method and to the display device comprising a multimedia terminal implementing the display method. The invention also relates to a method for control of an avatar comprising the selection of an object of size less than a threshold value in a virtual environment.

The invention claimed is:

1. A method for selecting a first object of a first virtual environment, said first object being displayed on a display device of a real environment with a size value less than a threshold value, said method comprising:
   determining a direction associated with a pointing gesture of a user;
   determining a second object associated with said first object, said second object corresponding to a first intersection between said second object and said determined direction when departing from a part of a body of said user making said pointing gesture, said second object having a size value greater than said threshold value and belonging to said real environment, said first object being different from a graphical representation of said second object, wherein said first intersection is calculated between a ray and a first element encountered by said ray, said ray: (i) having as origin, said part of said body of said user making said pointing gesture, (ii) having as direction, said direction associated with said pointing gesture and (iii) having as orientation, an orientation associated with said pointing gesture, and wherein when no object is intersected by said ray, an object closest to said ray and situated within a tolerance zone surrounding said ray is determined to be said second object; and
   selecting, by an avatar representing said user in said first virtual environment, said displayed first object according to said determined second object.

2. The method according to claim 1, wherein said threshold value is determined according to information representative of an imprecision of said determining of said direction.

3. The method according to claim 2, wherein said threshold value corresponds to a smallest dimension representative of a box bounding said first object, said smallest dimension being greater than a predetermined value.

4. The method according to claim 1, wherein said real environment is mapped in three dimensions.

5. The method according to claim 1, wherein said first object belongs to a group of first objects, said second object belongs to a group of second objects, and said selection of said first object comprises use of a table establishing an association between said first object and said second object.

6. The method according to claim 1, further comprised of acquiring said pointing gesture using a video camera and at least one item of depth information.

7. The method according to claim 1, wherein said direction of said pointing gesture is determined by detecting said part of said body of said user making said pointing gesture, and by determining a longitudinal axis of said part of said body in a three dimensional space.

8. A multimedia terminal comprising a unit for reception of signals representative of captured pictures and a central unit adapted for picture processing, wherein said central unit is configured for enabling selection of a first object of a first virtual environment, said first object being displayed on a display device of a real environment with a size value less than a threshold value, by performing or enabling:
   determining a direction associated with a pointing gesture of a user;
   determining a second object associated with said first object, said second object corresponding to a first intersection between said second object and said determined direction when departing from a part of a body of said user making said pointing gesture, said second object having a size value greater than said threshold value and belonging to said real environment, said first object being different from a graphical representation of said second object, wherein said first intersection is calculated between a ray and a first element encountered by said ray, said ray: (i) having as origin, said part of said body of said user making said pointing gesture, (ii) having as direction, said direction associated with said pointing gesture and (iii) having as orientation, an orientation associated with said pointing gesture, and wherein when no object is intersected by said ray, an object closest to said ray and situated within a tolerance zone surrounding said ray is determined to be said second object; and selecting, by an avatar representing said user in said first virtual environment, said displayed first object according to said determined second object.

9. The multimedia terminal according to claim 8, wherein said threshold value is determined according to information representative of an imprecision of said estimating of said direction.

10. The multimedia terminal according to claim 9, wherein said threshold value corresponds to a smallest dimension representative of a box bounding said first object, said smallest dimension being greater than a predetermined value.

11. The multimedia terminal according to claim 8, wherein said real environment is mapped in three dimensions.

12. The multimedia terminal according to claim 8, wherein said first object belongs to a group of first objects, said second object belongs to a group of second objects, and said selection of said first object comprises use of a table establishing an association between said first object and said second object.

13. The multimedia terminal according to claim 8, wherein said central unit is further configured for detecting said part of said body of said user making said pointing gesture and for determining a longitudinal axis of said part of said body in a three dimensional space.

* * * * *